United States Patent [19]

Lindemann

[11] 4,001,160

[45] Jan. 4, 1977

[54] AQUEOUS EMULSION ADHESIVES BASED ON C$_2$-C$_8$ ETHERS OF N-METHYLOL AMIDES COPOLYMERIZED WITH VINYL ESTERS IN THE PRESENCE OF HYDROXY FUNCTIONAL PROTECTIVE COLLOIDS

[75] Inventor: Martin K. Lindemann, Greenville, S.C.

[73] Assignee: Chas. S. Tanner Co., Greenville, S.C.

[22] Filed: Feb. 18, 1975

[21] Appl. No.: 550,815

Related U.S. Application Data

[63] Continuation-in-part of Ser. No. 401,088, Sept. 26, 1973, Pat. No. 3,941,735.

[52] U.S. Cl. .................... 260/29.6 WA; 260/17 R; 260/17 A; 260/29.6 TA; 260/29.6 H; 260/29.6 B
[51] Int. Cl.$^2$ .................... C08L 1/28; C08L 23/08
[58] Field of Search ............ 260/29.6 TA, 29.6 H, 260/29.6 B, 29.6 PW, 29.6 WA, 17 A, 17 R

[56] References Cited

UNITED STATES PATENTS

| | | | |
|---|---|---|---|
| 2,984,588 | 5/1961 | Graulich | 260/29.6 TA |
| 3,189,581 | 6/1965 | Hart et al. | 260/29.6 TA |
| 3,247,139 | 4/1966 | Christenson et al. | 260/29.6 TA |
| 3,288,740 | 11/1966 | Maeder et al. | 260/29.6 TA |
| 3,301,809 | 1/1967 | Goldberg et al. | 260/29.6 |
| 3,345,318 | 10/1967 | Lindemann et al. | 260/29.6 TA |
| 3,689,999 | 2/1968 | Sekmakas et al. | 260/29.6 TA |
| 3,692,726 | 9/1972 | Ochmichen | 260/29.6 TA |
| 3,708,388 | 1/1973 | Lindemann et al. | 260/29.6 TA |
| 3,808,168 | 4/1974 | Young et al. | 260/72 R |
| 3,852,233 | 12/1974 | Lindemann | 260/29.6 TA |

*Primary Examiner*—Edward M. Woodberry
*Attorney, Agent, or Firm*—Dressler, Goldsmith, Clement, Gordon & Shore, Ltd.

[57] ABSTRACT

Vinyl esters, such as vinyl acetate, are copolymerized, especially with ethylene or maleate or fumarate diester, to provide adhesives which develop water resistance through cure by including in the copolymer at least 0.5% of an N-methylol functional monoethylenic amide monomer etherified with a C$_2$–C$_8$ volatile, alcohol. The monomers are stabilized during the copolymerization by an hydroxy functional protective colloid.

12 Claims, No Drawings

AQUEOUS EMULSION ADHESIVES BASED ON $C_2-C_8$ ETHERS OF N-METHYLOL AMIDES COPOLYMERIZED WITH VINYL ESTERS IN THE PRESENCE OF HYDROXY FUNCTIONAL PROTECTIVE COLLOIDS

This application is a continuation-in-part of my prior application Ser. No. 401,088, filed Sept. 26, 1973, now U.S. Pat. No. 3,941,735 issued Mar. 2, 1976.

The present invention relates to vinyl ester aqueous emulsion adhesives which develop water resistance through cure, especially using copolymers of vinyl acetate with ethylene.

In the aqueous emulsion adhesives under consideration, the adhesive characteristic is supplied by the combination of an emulsion copolymer stabilized in the emulsion by an hydroxy functional protective colloid, especially polyvinyl alcohol or hydroxy ethyl cellulose, as the essential agents stabilizing the emulsion. Specifically, anionic and nonionic surfactants should not be present as the primary emulsifier, though small amounts of such agents for ancillary purpose, such as reducing surface tension, may be used.

Adhesives of the type under consideration are known, as illustrated for example in U.S. Pat. No. 3,708,388, in which I am a coinventor. However, these prior adhesives lack water resistance, and this limits the utility of the adhesive.

In U.S. Pat. No. 3,708,388 it was found that when monomers providing thermosetting capacity were present, instead of protective colloids, such as polyvinyl alcohol or hydroxy ethyl cellulose, the adhesive quality was impaired. Further, if monomers providing thermosetting capacity, and especially N-methylol acrylamide, are present during the emulsion copolymerization together with the hydroxy functional protective colloid, then it is found that the curing reaction between the N-methylol group and the hydroxy group takes place during the polymerization. This produces excessive emulsion viscosities and, at times, produces a cheesy or gel-like emulsion which is useless.

The tendency for excessive emulsion viscosity or gelation can be combatted by reducing the resin solids content of the emulsion, but this is disadvantageous because compounding is more difficult, and the adhesive dries more slowly. Also, one has not prevented the premature reaction between the N-methylol group and the hydroxy group, but merely rendered such premature reaction more tolerable. As a result, the ultimate curing potential is sacrificed. Moreover, the maximum proportion of N-methylol functionality which can be accepted in the copolymer is also reduced.

It is noted in passing that the reaction between the N-methylol group and the hydroxy group is extremely rapid, and the aqueous emulsion environment easily allows the water of reaction to dissipate into the aqueous phase of the latex, so there is no control over water removal as is possible when proceeding in water immiscible solvent solution to minimize premature reaction.

In accordance with this invention, vinyl ester, especially vinyl acetate, is polymerized in aqueous emulsion in the presence of hydroxy-functional protective colloid as the essential emulsifying agent, and an N-methylol-functional monomer is included as a preformed ether in order that the copolymer which is formed will include N-methylol functionality. In this invention it is found that when the N-methylol functional monomer is present as a preformed ether with a volatile alcohol, such as a $C_1-C_8$ alcohol, that prereaction of the ether with the hydroxy-functional protective colloid is largely avoided and the resulting aqueous emulsion suffers very little increase in viscosity and retains substantially all of its adhesive quality. At the same time, and where water resistance is desired, the imposition of a moderate bake causes the alcohol to volatilize away and the N-methylol functionality which is thereby regenerated reacts rapidly to provide the desired water resistance.

It will be appreciated that the curing reaction may include reaction of N-methylol with itself, with the hydroxy groups in the protective colloid (which form part of the deposited film) and also with reactive groups, such as hydroxy groups, which may be present on the surfaces which are bonded together. In such instance, the initial adhesive bond can be substantially enhanced as opposed to the degradation in adhesion reported for the polyvinyl alcohol stabilized copolymer in said U.S. Pat. No. 3,708,388.

Referring more particularly to the hydroxyfunctional protective colloid, these have been illustrated hereinbefore and are employed in an amount of about 0.05% to 10%, preferably from 0.1% to 5%, based on the total weight of the latex.

The vinyl ester which is used is preferably vinyl acetate, but all of the vinyl esters with saturated aliphatic monocarboxylic acids are useful, vinyl propionate, vinyl stearate and vinyl versatate further illustrating the class under consideration. Acids containing up to 18 carbon atoms are particularly contemplated. At least 40% of the copolymer, preferably at least 55% of the copolymer, will consist of vinyl ester, preferably vinyl acetate.

The vinyl ester may constitute the entire balance of the copolymer aside from the reactive monomer or monomers conferring curing capacity. Indeed, a copolymer containing in excess of 90% by weight of vinyl acetate with less than 10% by weight of N-methylol ether can be used. These copolymers provide excellent adhesives for wood, with the N-methylol ether providing the cure capacity needed to provide desired water resistance.

On the other hand, it is frequently desired to include in the copolymer from 5–40%, preferably from 20–40% of ethylene, based on the weight of the copolymer. Ethylene is of significance in the development of the desired adhesive characteristic in many instances, e.g., for the lamination of plastic films, such as polyvinyl chloride, to paper or wood. While the ethylene can be omitted or replaced, this invention has especial applicability to vinyl ester-ethylene copolymers. These are also of especial value for carpet backing, where water resistance is particularly desired.

If the ethylene component is to be replaced, other plasticizing nonreactive monomers may be substituted, particularly monoethylenic esters such as an acrylate, maleate, or fumarate ester containing from 2–18 carbon atoms in the ester group can be used, such as n-butyl acrylate, isobutyl acrylate or dibutyl maleate. These esters, if used, would be employed in an amount of 5–60%, preferably from 20–50%, based on the weight of the copolymer. The maleate and fumarate esters, and especially the diesters, are preferred esters for use herein.

The monomers providing thermosetting or cure capacity may be used in an amount of from 0.5–15%, preferably 2–10%, based on the weight of the copolymer. At least 0.5%, preferably at least 1%, based on the weight of the copolymer, will be constituted by the monoethylenic N-methylol ether, preferably from 1% to 8%. However, other monomers which can coreact with the N-methylol group may also be present to assist in the cure, such as monoethylenic amides or alcohols, either alone or together with a monoethylenic carboxylic acid.

The coreactive monomers are illustrated by acrylamide, methacrylamide, or other monoethylenic amide, or by allyl alcohol, 2-hydroxy ethyl acrylate or methacrylate, or the like. Monoethylenic carboxylic acids are illustrated by acrylic, methacrylic, crotonic or itaconic acids, or the like. Sulphonic acids, or their salts, such as 2-sulpho ethyl methacrylate or sodium vinyl sulphonate are also useful.

The selection of the N-methylol component which is used herein in ether form is subject to wide variation, and any monoethylenic monomer carrying amide or amine functionality can be reacted with formaldehyde to provide an N-methylol functional monoethylenic monomer which is useful herein after etherification with volatile alcohol. The monomers which are frequently thought of in this category are alpha, beta-monoethylenic carboxylic acid amides, which is a well known class of monomers. N-methylol acrylamide or methacrylamide typify this known class, and are useful herein, though these are not preferred, in part because the methyl ethers of these highly reactive, water soluble and easily homopolymerizable monomers do not perform well in the aqueous emulsion copolymerization, and this is especially true when ethylene is present. Also, the methyl ether of the water soluble acrylamide derivative is largely in the water phase where it is more proximate to the polyvinyl alcohol or other protective colloid, and less proximate to the emulsified monomers where copolymerization is desired. This minimizes the insolubilization capacity of the methylated N-methylol acrylamide-based monomer, and it increases the undesired viscosity thickening effect.

Accordingly, I prefer to use ethers of N-methylol allyl carbamate and the like, as is more fully described and specifically claimed in my said prior application Ser. No. 401,088.

The N-methylol groups in this invention are etherified with a volatile alcohol, usually a $C_1 - C_8$ alcohol, preferably a $C_1-C_4$ alcohol. The alcohol is released on baking to regenerate the N-methylol group for cure, as is well known. Preferred alcohols are methyl alcohol and ethyl alcohol. Propyl alcohol, isopropyl alcohol, butyl alcohol, and isobutyl alcohol are also highly effective. 2-ethoxy ethanol and 2-butoxy ethanol are also useful. As has been pointed out, when using an N-methylol derivative of an acrylamide, the methyl ether should be avoided and a $C_2-C_8$ alcohol is more appropriate. Also, the longer the chain length of the alcohol, the harder it is to remove it completely by volatilization to allow the cure to proceed to completion.

The invention is illustrated in the following examples in which all parts are by weight unless otherwise indicated. Some of the examples illustrate the invention by way of contrast.

EXAMPLE 1

The following was charged to a 1 - gallon stainless steel polymerization reactor equipped with temperature controls and an agitator.

| Charge Composition | (Parts) |
|---|---|
| 1100 grams | Water |
| 53.3 grams | Polyvinyl Alcohol (88% hydrolyzed polyvinyl acetate [4% solution viscosity 5 cps.]) |
| 74 grams | Seed Latex (Previously prepared - see Note 1) |
| 5 grams | Sodium Formaldehyde Sulfoxylate |
| 0.4 gram | Sodium Benzoate |
| 0.02 gram | Ferrous Sulfate |
| 900 grams | Vinyl Acetate |
| 500 grams | Dibutyl Maleate |

Water and polyvinyl alcohol were first charged to the reactor and agitated at 50° C. until completely dissolved before the remaining ingredients were charged.

The pH of the monomer emulsion was adjusted to 4.8 with 2 cc. of 18% HCl, and the temperature raised to 60° C. at which point a catalyst solution prepared as shown below is introduced drop wise over two hours to maintain the reaction.

| Catalyst Solution |
|---|
| 66 grams Water |
| 5 grams Sodium Benzoate |
| 29 grams Hydrogen Peroxide (35% $H_2O_2$ in water) |

A total of 50 cc. of the above catalyst solution was used to complete the reaction.

Periodic additions of a 15% solution of sodium formaldehyde sulfoxylate was made to maintain a reducing environment until a total of 20 cc's had been added.

The reaction was carried out at minimum reflux temperature (69°–74° C.). The reaction was completed with the addition of 2 cc's of tertiary butyl hydroperoxide when the unreacted monomer was reduced to about 2%, and this lowers the unreacted monomer content to about 0.5%.

Note 1 -- The seed latex is a commercially produced polyvinyl acetate latex with particle size of .15 micron (any latex having the same particle size may be substituted).

The final latex product had the following properties:

| | |
|---|---|
| Viscosity (Brookfield, spindle No. 2, 20 rpm) | 1180 cps. |
| Solids (percent) | 54.8 |
| Intrinsic viscosity (dimethyl formamide at 30°C.) | 1.47 |
| Average particle size (microns) | 0.35 |
| Insolubles in Trichloroethylene (percent) | 4.3 |
| Mechanical stability (Hamilton Beech) - | & stable 20+ minutes |
| pH | & 5.7 |
| Surface Tension (dynes/cm) | 49 |

Note 2 – 3.4 grams of Hercules 831, a known defoamer may be added, if desired, to help control foaming.

The 4.3% insolubility is measured after a bake of 5 minutes at 280° F. and reflects the fact that there is no curing mechanism available, so the bulk of the film simply dissolved.

EXAMPLE 2

The procedure and recipe set forth in Example 1 were repeated except that 28 grams of N-methoxy methyl acrylamide were added to the monomer emulsion prior to polymerization, and then the reaction was carried out as before.

The latex product had the following properties:

| The latex product had the following properties: | |
|---|---|
| Viscosity (Brookfield, spindle No. 4, 20 rpm) | 3100 cps. |
| Solids (percent) | 54.3 |
| Intrinsic viscosity (dimethyl formamide, 30° C.) | 0.70 |
| Average particle size (microns) | 0.77 |
| Insolubles in Trichloroethylene (percent) | 20.2 |
| Swell Index | 11.3 |
| Mechanical Stability (Hamilton Beech) | & Stable 20+ minutes |
| pH | & 4.9 |
| Surface Tension (dynes/cm) | 49 |

As can be seen, the viscosity is about three fold higher and the insolubility after the standard bake is only 20.2%, indicating that almost 80% of the film dissolved.

EXAMPLE 3

The procedure and recipe set forth in Example 1 were repeated except that 28 grams of N-isobutoxy methyl acrylamide were uniformly and continuously added over two hours.

| The product had the following properties: | |
|---|---|
| Viscosity (Brookfield, spindle No. 2, 20 rpm) | 1500 cps. |
| Solids (percent) | 55.8 |
| Intrinsic Viscosity (dimethyl formamide, 30° C.) | 0.74 |
| Average particle size (microns) | 0.30 |
| Average particle size (microns) | 0.39 |
| Insolubles in Trichloroethylene (percent) | 33.1 |
| Swell Index | 9.8 |
| Mechanical stability (Hamilton Beech) | & Stable 20+ minutes |
| pH | & 6.2 |
| Surface Tension (dynes/cm) | 51.8 |

As can be seen, the viscosity is far lower than in Example 2, and almost as low as in the thermoplastic Example 1, and the insolubility was distinctly raised from 20.2% to 33.1%.

The results in the previous examples, and some further data are tabulated below.

| Ex. | Solids | Viscosity | % Insolubility in Trichloro-ethylene | Percent Cross-Linking Monomer |
|---|---|---|---|---|
| 1 | 54.8% | 1180 | 4.3 | — |
| 2 | 54.3% | 3100 | 20.2 | 2% N-methoxymethyl acrylamide |
| 3 | 55.8% | 1500 | 33.1 | 2% N-isobutoxymethyl acrylamide |
| 4 | 52% | 625 | 13.57 | — |
| 5* | 48.5% | 920 | 16.44 | 2% N-methylol acrylamide |

*made using Example 4 as control

As can be seen from the above tabulation, the use of N-methylol acrylamide in Example 5 was detrimental. It would appear that much of the N-methylol acrylamide reacted with the hydroxy functional colloid (the polyvinyl alcohol) which is dispersed in the aqueous continuum. Thus, viscosity was greatly increased in comparison with the Example 4 control, but the insolubility remained poor. Capping the N-methylol acrylamide with methyl alcohol as in Example 2 was somewhat helpful since some limited insolubilization took place, but a very extensive reaction occurred with the hydroxy functional colloid resulting in extensive thickening so the net benefit on the limited insolubilization is questionable. On the other hand, the use of longer chain alcohols to cap the N-methylol acrylamide, as in Example 3, produced a greater insolubilization, and the viscosity remained essentially unchanged (note the increase in solids content). Thus, the use of etherifying alcohols of higher molecular weight than methanol yields surprisingly superior results when water soluble highly reactive acrylamide or methacrylamide derivatives are used herein. The art suggests no reason for this marked difference in result.

While detailed comparisons have been made in the vinyl acetate-ethylene copolymer system, essentially the same results are obtainable with any vinyl acetate polymer, including vinyl acetate homopolymer (only vinyl aceate and reactive monomers).

Copolymers with ethylene are particularly contemplated and the copolymerization including the N-methylol ether monomer is illustrated in my prior application Ser. No. 401,088.

Some insolubilization occurs without baking, especially on exposure to sunlight. Thus, the adhesive emulsions disclosed herein can be pigmented to form paints which insolubilize on exposure, especially in the sun, for use both indoors and outdoors.

All of the previous results were obtained by baking 5 minutes at 280° F. which represents typical baking conditions. On the other hand, particularly where the ethyl ethers are employed, these volatilize at room temperature, and insolubility develops with time.

The invention is defined in the claims which follow in which all proportions are by weight.

I claim:

1. An aqueous adhesive emulsion which develops water resistance through cure, the water of said emulsion having emulsified therein an aqueous emulsion copolymer consisting essentially of monoethylenic monomers, at least 40% up to 99.5% of the copolymer being vinyl ester of a saturated aliphatic monocarboxylic acid having up to 18 carbon atoms and from 0.5–15% of the copolymer of monomers providing thermosetting characteristics and consisting essentially of an N-methylol derivative of acrylamide or methacrylamide etherified with a $C_2 - C_8$ alcohol, any balance of said copolymer consisting essentially of nonreactive monoethylenic monomers copolymerizable with said vinyl ester, the monomers of said copolymer being emulsified during copolymerization by from 0.05% to 10% of an hydroxy functional protective colloid selected from the group consisting of polyvinyl alcohol and hydroxy ethyl cellulose.

2. An aqueous adhesive emulsion as recited in claim 1 in which said hydroxy functional protective colloid is polyvinyl alcohol.

3. An aqueous adhesive emulsion as recited in claim 1 in which said copolymer includes from 5–40% ethylene.

4. An aqueous adhesive emulsion as recited in claim 1 in which said copolymer includes from 20–40% ethylene.

5. An aqueous adhesive emulsion as recited in claim 1 in which from 5–60% of monoethylenic maleate or fumarate alcohol diester containing from 2–18 carbon atoms is included in the copolymer.

6. An aqueous adhesive emulsion as recited in claim 1 in which said monomers providing thermosetting characteristics are present in an amount of from 2–10%.

7. An aqueous adhesive emulsion as recited in claim 1 in which said copolymer contains at least 55%, up to 94.5%, of vinyl acetate, and from 5–40% of ethylene.

8. An aqueous adhesive emulsion as recited in claim 1 in which said copolymer contains at least 40% of vinyl acetate, and from 5–60% of maleate or fumarate diester containing 2–18 carbon atoms in the ester group.

9. An aqueous adhesive emulsion as recited in claim 1 in which said copolymer consists essentially of at least 90% of vinyl acetate, the balance being the said monomers providing thermosetting characteristics.

10. An aqueous adhesive emulsion which develops water resistance through cure, the water of said emulsion having emulsified therein an aqueous emulsion copolymer consisting essentially of monoethylenic monomers, at least 55% up to 94.5% of the copolymer being vinyl acetate, from 0.5–15% of the copolymer of monomers providing thermosetting characteristics and consisting essentially of an N-methylol derivative of an alpha,beta-monoethylenic carboxylic acid amide etherified with a $C_2$–$C_8$ alcohol, the balance of said copolymer consisting essentially of from 5–40% of ethylene, the monomers of said copolymer being emulsified during copolymerization by from 0.05% to 10% of an hydroxy functional protective colloid selected from the group consisting of polyvinyl alcohol and hydroxy ethyl cellulose.

11. An aqueous adhesive emulsion as recited in claim 10 in which said amide is acrylamide or methacrylamide.

12. An aqueous adhesive emulsion as recited in claim 10 in which said hydroxy functional protective colloid is polyvinyl alcohol.

* * * * *